Patented Oct. 30, 1945

2,388,025

UNITED STATES PATENT OFFICE 2,388,025

α-CHLOROETHYL SULPHIDES AND PROCESS OF PREPARING THE SAME

Lewis A. Walter and Louis H. Goodson, East Orange, N. J., assignors to The Maltbie Chemical Company, Newark, N. J., a corporation of New Jersey No Drawing. Application May 6, 1942, Serial No. 441,971

2 Claims. (Cl. 260—609)

The present invention relates to new and useful compositions of matter comprising a series of novel organic chemical compounds, and to a process for their preparation.

We have designated our novel compounds α-chloroethyl sulphides, according to what we believe to be the accepted method of nomenclature; but they may also be described, correctly, as thioethylidene chlorides. These compounds have the formula:

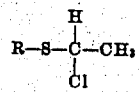

wherein R represents a hydrocarbon group, containing more than two (i. e., three or more) carbon atoms; and in which it is to be understood that R has a carbon atom attached directly to the sulphur atom of the thioethylidene group

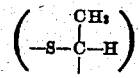

and, further, that that same carbon atom also has one or more carbon atoms attached to it. This is hereafter illustrated by primary or secondary groups with straight or branched, saturated or unsaturated, chains.

Our novel compounds have been found to be useful intermediates, and may be applied with advantage in organic syntheses for the purpose of introducing the

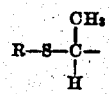

group into organic molecules, as, for example, in the preparation of substituted malonic esters.

Our novel compounds, having the above general formula, may be produced, and, in general, in excellent yields, by the reaction of paraldehyde and the appropriate mercaptan with hydrogen chloride at temperatures from approximately −40° C. to approximately 40° C., although we ordinarily prefer to employ temperatures ranging from about −10° to about 5° C., in the manner fully illustrated in the examples given below. The general reaction is represented by the equation:

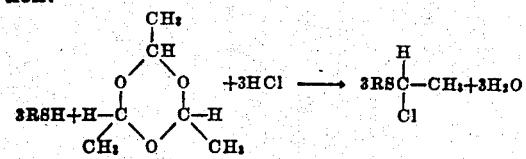

In the examples given, the compounds are colorless, foul smelling liquids. They may be distilled at low pressures, although partial decomposition may sometimes occur. However, the crude reaction products may ordinarily be used without being distilled.

The following specific examples are illustrative of the novel compounds, and of our process for their preparation:

Example 1 n-Butyl-(α-chloroethyl) sulphide:

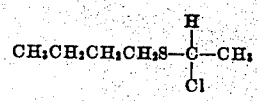

A mixture of one mole of n-butyl mercaptan and ⅓ mole of paraldehyde is chilled to −10° and well stirred while a stream of gaseous hydrogen chloride is bubbled through the mixture at such a rate that the temperature does not rise above 0°. When hydrogen chloride is no longer absorbed, the n-butyl-(α-chloroethyl) sulphide is separated from the aqueous layer and dried by contact with anhydrous calcium chloride. The product is filtered, aerated to remove hydrogen chloride, and used directly, or it may be distilled with slight decomposition at about 65–67° at a pressure of 13 mm. of mercury. The yield of distilled product is of the order of 70–90%.

Example 2 n-Amyl-(α-chloroethyl) sulphide:

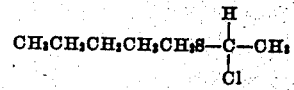

A mixture of one mole of n-amyl mercaptan and ⅓ mole of paraldehyde is chilled to −10° and well stirred while a stream of gaseous hydrogen chloride is bubbled through the mixture at such a rate that the temperature does not rise above 0°. When hydrogen chloride is no longer absorbed the n-amyl-(α-chloroethyl) sulphide is separated from the aqueous layer and dried by contact with anhydrous calcium chloride. The product is filtered, aerated to remove hydrogen chloride, and used directly, or it may be distilled with slight decomposition at about 50–53° at a pressure of 1.5 mm. of mercury.

Example 3

Allyl-(α-chloroethyl) sulphide:

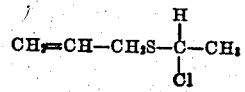

A mixture of one mole of allyl mercaptan and ⅓ mole of paraldehyde is chilled to —10° and well stirred while a stream of gaseous hydrogen chloride is bubbled through the mixture at such a rate that the temperature does not rise above 0° C. When hydrogen chloride is no longer rapidly absorbed the allyl-(α-chloroethyl) sulphide is separated from the aqueous layer and dried by contact with anhydrous calcium chloride. The product is filtered, aerated to remove hydrogen chloride, and used directly.

*Example 4*

Isopropyl-(α-chloroethyl) sulphide:

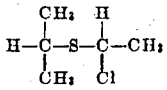

A mixture of one mole of isopropyl mercaptan and ⅓ mole of paraldehyde is chilled to —10° and well stirred while a stream of gaseous hydrogen chloride is bubbled through the mixture at such a rate that the temperature does not rise above 0°. When hydrogen chloride is no longer absorbed the isopropyl-(α-chloroethyl) sulphide is separated from the aqueous layer and dried by contact with anhydrous calcium chloride. The product is filtered, aerated to remove hydrogen chloride, and used directly, or it may be distilled with slight decomposition at about 43° at a pressure of 12.5 mm. of mercury.

The substituent group R may be widely varied; and among the compounds which have been successfully prepared by the foregoing process, and which are specifically included in the invention, including the specific examples given above, are the following:

n-Butyl-(α-chloroethyl) sulphide
Cyclohexyl-(α-chloroethyl) sulphide
n-Amyl-(α-chloroethyl) sulphide
Isoamyl-(α-chloroethyl) sulphide
Allyl-(α-chloroethyl) sulphide
Isopropyl-(α-chloroethyl) sulphide In the foregoing examples the boiling points are approximate, and at about the pressures given; but are the boiling points actually observed, according to a procedure believed to be reliable. All temperatures are centigrade.

The examples given above, and illustrative processes for their production, include the best embodiments of our present invention now known to us; but it is to be understood that the invention is not necessarily or specifically limited thereto and may, under proper conditions, have other embodiments, produced in other ways, without departure from the spirit of the invention, and within the scope of the following claims.

We claim:

1. The process of producing an α-chloroethyl sulphide which comprises treating a mixture of approximately one mole of a mercaptan having the formula RSH, wherein R represents a hydrocarbon group containing at least three carbon atoms and wherein one of these carbon atoms is directly connected to the sulphur atom, and approximately one-third mole of paraldehyde with gaseous hydrogen chloride at a temperature between about —10° and about 5° C. and recovering the resulting α-chloroethyl sulphide reaction product.

2. n-Amyl-(α-chloroethyl) sulphide.

LEWIS A. WALTER.
LOUIS H. GOODSON.